(12) United States Patent
Bazilio

(10) Patent No.: US 11,686,373 B2
(45) Date of Patent: Jun. 27, 2023

(54) MULTI-SPEED TRANSMISSION

(71) Applicant: ALLISON TRANSMISSION, INC., Indianapolis, IN (US)

(72) Inventor: Rayman E. Bazilio, Indianapolis, IN (US)

(73) Assignee: ALLISON TRANSMISSION, INC., Indianapolis, IN (US)

(*) Notice: Subject to any disclaimer, the term of this patent is extended or adjusted under 35 U.S.C. 154(b) by 0 days.

(21) Appl. No.: 17/831,601

(22) Filed: Jun. 3, 2022

(65) Prior Publication Data

US 2022/0290740 A1    Sep. 15, 2022

Related U.S. Application Data

(62) Division of application No. 17/328,155, filed on May 24, 2021, now Pat. No. 11,359,701, which is a division of application No. 16/697,930, filed on Nov. 27, 2019, now Pat. No. 11,035,440.

(51) Int. Cl.
 *F16H 3/62* (2006.01)

(52) U.S. Cl.
 CPC ....... *F16H 3/62* (2013.01); *F16H 2200/0069* (2013.01); *F16H 2200/0078* (2013.01); *F16H 2200/2012* (2013.01); *F16H 2200/2048* (2013.01); *F16H 2200/2051* (2013.01)

(58) Field of Classification Search
 CPC ........ F16H 2200/2051–2061; F16H 3/62–666; F16H 2200/2012–2017; F16H 2200/0069–0078
 See application file for complete search history.

(56) References Cited

U.S. PATENT DOCUMENTS

| | | | |
|---|---|---|---|
| 2009/0118058 A1* | 5/2009 | Suh | F16H 3/66 |
| | | | 475/275 |
| 2015/0031496 A1* | 1/2015 | Hoffman | F16H 3/62 |
| | | | 475/269 |
| 2019/0011028 A1* | 1/2019 | Lee | F16H 3/66 |

FOREIGN PATENT DOCUMENTS

DE    102014224089 A1 *  6/2016

* cited by examiner

*Primary Examiner* — Ernesto A Suarez
*Assistant Examiner* — Lillian T Nguyen
(74) *Attorney, Agent, or Firm* — Taft Stettinius & Hollister LLP; Stephen F. Rost

(57) ABSTRACT

A multiple speed transmission includes an input member, an output member, first, second, third and fourth planetary gearsets each having first, second and third members, and a plurality of interconnecting members each connected between at least one of the first, second, third, and fourth planetary gearsets and at least another of the first, second, third, and fourth planetary gearsets. The transmission includes a plurality of torque-transmitting mechanisms between the input and output members, wherein the torque transmitting mechanisms are selectively engageable in combinations of at least four to establish at least ten forward speed ratios between the input member and the output member.

20 Claims, 6 Drawing Sheets

| Range | C1 | C2 | C3 | C4 | C5 | C6 | C7 |
|---|---|---|---|---|---|---|---|
| F1 | X | X | | | X | X | |
| F2 | X | | X | | X | X | |
| F3 | | X | X | | X | X | |
| F4 | X | X | | | X | | X |
| F5 | X | X | | X | | X | |
| F6 | X | | X | | X | | X |
| F7 | X | | X | X | | X | |
| F8 | | X | X | | X | | X |
| F9 | | X | X | X | | X | |
| F10 | X | X | | X | | | X |
| F11 | X | | X | X | | | X |
| F12 | | X | X | X | | | X |

Fig. 6

| Range | C1 | C2 | C3 | C4 | C5 | C6 | C7 | C8 |
|---|---|---|---|---|---|---|---|---|
| F1 | X | X | | | X | X | | |
| F2 | X | | X | | X | X | | |
| F3 | | X | X | | X | X | | |
| F4 | X | X | | | X | | X | |
| F5 | X | X | | X | | X | | |
| F6 | X | | X | | X | | X | |
| F7 | X | | X | X | | X | | |
| F8 | | X | X | | X | | X | |
| F9 | | X | X | X | | X | | |
| F10 | X | X | | X | | | X | |
| F11 | X | | X | X | | | X | |
| F12 | | X | X | X | | | X | |
| R1 | | X | | | X | X | | X |
| R2 | | X | | X | | X | | X |
| R3 | | X | | X | | | X | X |

Fig. 7

MULTI-SPEED TRANSMISSION

RELATED APPLICATIONS

This application is a divisional of U.S. patent application Ser. No. 17/328,155, filed May 24, 2021, which is a divisional of U.S. patent application Ser. No. 16/697,930, filed Nov. 27, 2019 and entitled "MULTI-SPEED TRANSMISSION," the disclosures of which are hereby incorporated by reference in their entirety.

FIELD OF THE DISCLOSURE

The present disclosure relates to a multiple speed transmission, and in particular to a multiple speed transmission capable of achieving ten or more speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the first member of the third planetary gearset; a third torque-transmitting mechanism selectively engageable to interconnect the second member of the second planetary gearset and the third member of the first planetary gearset with the first member of the third planetary gearset; a fourth torque-transmitting mechanism selectively engageable to interconnect the first member of the third planetary gearset with the second member of the third planetary gearset and the first member of the fourth planetary gearset; a fifth torque-transmitting mechanism selectively engageable to interconnect the third member of the third planetary gearset with the stationary member; a sixth torque-transmitting mechanism selectively engageable to interconnect the third member of the fourth planetary gearset with the stationary member; a seventh torque-transmitting mechanism selectively engageable to interconnect the second member of the third planetary gearset and the first member of the fourth planetary gearset to the second member of the fourth planetary gearset; wherein the torque transmitting mechanisms are selectively engageable in combinations of at least four to establish at least ten forward speed ratios between the input member and the output member.

In one example of this embodiment, the input member is continuously interconnected with the third member of the second planetary gearset. In a second example, the output member is continuously interconnected with the second member of the fourth planetary gearset. In a third example, the plurality of interconnecting members includes a first interconnecting member continuously interconnecting the first member of the first planetary gearset with the first member of the second planetary gearset. In a fourth example, the plurality of interconnecting members includes a second interconnecting member directly connected to the second member of the first planetary gearset.

In a fifth example, the plurality of interconnecting members includes a third interconnecting member continuously interconnecting the third member of the first planetary gearset with the second member of the second planetary gearset. In a sixth example, the plurality of interconnecting members includes a fourth interconnecting member directly connected to the first member of the third planetary gearset. In a seventh example, the plurality of interconnecting members includes a fifth interconnecting member continuously interconnecting the second member of the third planetary gearset to the first member of the fourth planetary gearset.

In an eighth example, the plurality of interconnecting members includes a sixth interconnecting member directly connected to the third member of the third planetary gearset. In a ninth example, the plurality of interconnecting members includes a seventh interconnecting member directly connected to the third member of the fourth planetary gearset. In a tenth example, the input member and the output member are axially aligned with one another. In an eleventh example, an eighth torque-transmission mechanism is selectively engageable to interconnect the third member of the first planetary gearset and the second member of the second planetary gearset with a stationary member; wherein the torque transmitting mechanisms are selectively engageable in combinations of at least four to establish at least ten forward speed ratios and at least one reverse speed ratio between the input member and the output member.

In another embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the first member of the third planetary gearset; a third torque-transmitting mechanism selectively engageable to interconnect the second member of the second planetary gearset and the third member of the first planetary gearset with the first member of the third planetary gearset; a fourth torque-transmitting mechanism selectively engageable to interconnect the first member of the third planetary gearset with the second member of the third planetary gearset and the first member of the fourth planetary gearset; a fifth torque-transmitting mechanism selectively engageable to interconnect the third member of the third planetary gearset with the stationary member; a sixth torque-transmitting mechanism selectively engageable to interconnect the third member of the fourth planetary gearset with the stationary member; a seventh torque-transmitting mechanism selectively engageable to interconnect the second member of the third planetary gearset and the first member of the fourth planetary gearset to the second member of the fourth planetary gearset; and an eighth torque-transmission mechanism selectively engageable to interconnect the third member of the first planetary gearset and the second member of the second planetary gearset with a stationary member; wherein the torque transmitting mechanisms are selectively engageable in combinations of at least four to establish at least ten forward speed ratios and at least one reverse speed ratio between the input member and the output member.

In one example of this embodiment, the input member and the output member are axially aligned with one another.

In a further embodiment of the present disclosure, a multiple speed transmission includes an input member; an output member; first, second, third and fourth planetary gearsets each having a sun gear, a carrier member, and a ring gear; a plurality of interconnecting members each connected between at least one of the first, second, third, and fourth planetary gearsets and at least another of the first, second, third, and fourth planetary gearsets; a first torque-transmitting mechanism selectively engageable to interconnect the sun gear of the first planetary gearset and the sun gear of the second planetary gearset with a stationary member; a second torque-transmitting mechanism selectively engageable to interconnect the carrier member of the first planetary gearset with the sun gear of the third planetary gearset; a third torque-transmitting mechanism selectively engageable to interconnect the carrier member of the second planetary gearset and the ring gear of the first planetary gearset with the sun gear of the third planetary gearset; a fourth torque-transmitting mechanism selectively engageable to interconnect the sun gear of the third planetary gearset with the carrier member of the third planetary gearset and the sun gear of the fourth planetary gearset; a fifth torque-transmitting mechanism selectively engageable to interconnect the ring gear of the third planetary gearset with the stationary member; a sixth torque-transmitting mechanism selectively engageable to interconnect the ring gear of the fourth planetary gearset with the stationary member; a seventh torque-transmitting mechanism selectively engageable to interconnect the carrier member of the third planetary gearset and the sun gear of the fourth planetary gearset to the carrier member of the fourth planetary gearset; wherein the torque transmitting mechanisms are selectively engageable in combinations of at least four to establish at least ten forward speed ratios between the input member and the output member.

In one example of this embodiment, the input member is continuously interconnected with the ring gear of the second planetary gearset; the output member is continuously interconnected with the carrier member of the fourth planetary gearset; the input member and output member being axially aligned with one another. In a second example, the plurality of interconnecting members includes a first interconnecting member continuously interconnecting the sun gear of the first planetary gearset with the sun gear of the second planetary gearset. In a third example, the plurality of interconnecting members includes a second interconnecting member directly connected to the carrier member of the first planetary gearset.

In a fourth example, the plurality of interconnecting members includes a third interconnecting member continuously interconnecting the ring gear of the first planetary gearset with the carrier member of the second planetary gearset. In a fifth example, the plurality of interconnecting members includes a fourth interconnecting member directly connected to the sun gear of the third planetary gearset. In a sixth example, the plurality of interconnecting members includes a fifth interconnecting member continuously interconnecting the carrier member of the third planetary gearset to the sun gear of the fourth planetary gearset. In a seventh example, the plurality of interconnecting members includes a sixth interconnecting member directly connected to the ring gear of the third planetary gearset. In a further example, the plurality of interconnecting members includes a seventh interconnecting member directly connected to the ring gear of the fourth planetary gearset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 6 is a truth table presenting an example of a state of engagement of various torque transmitting mechanisms in each of the available forward speeds or gear ratios of the transmissions illustrated in FIGS. 2 and 4; and FIG. 7 is a truth table presenting an example of a state of engagement of various torque transmitting mechanisms in each of the available forward and reverse speeds or gear ratios of the transmissions illustrated in FIGS. 3 and 5.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Military tracked vehicles may require a high ratio coverage to provide maximum tractive effort at lower speeds, and low transmission losses at top operating speeds. Moreover, the transmission may be required to be adaptable to multiple axes, whether packaged on a single or parallel axes. There is a desire for a simple planetary transmission capable of being packaged to meet these requirements. Further, it may be desirable to package the transmission on a single axis or on a plurality of parallel axes.

Figure 1:
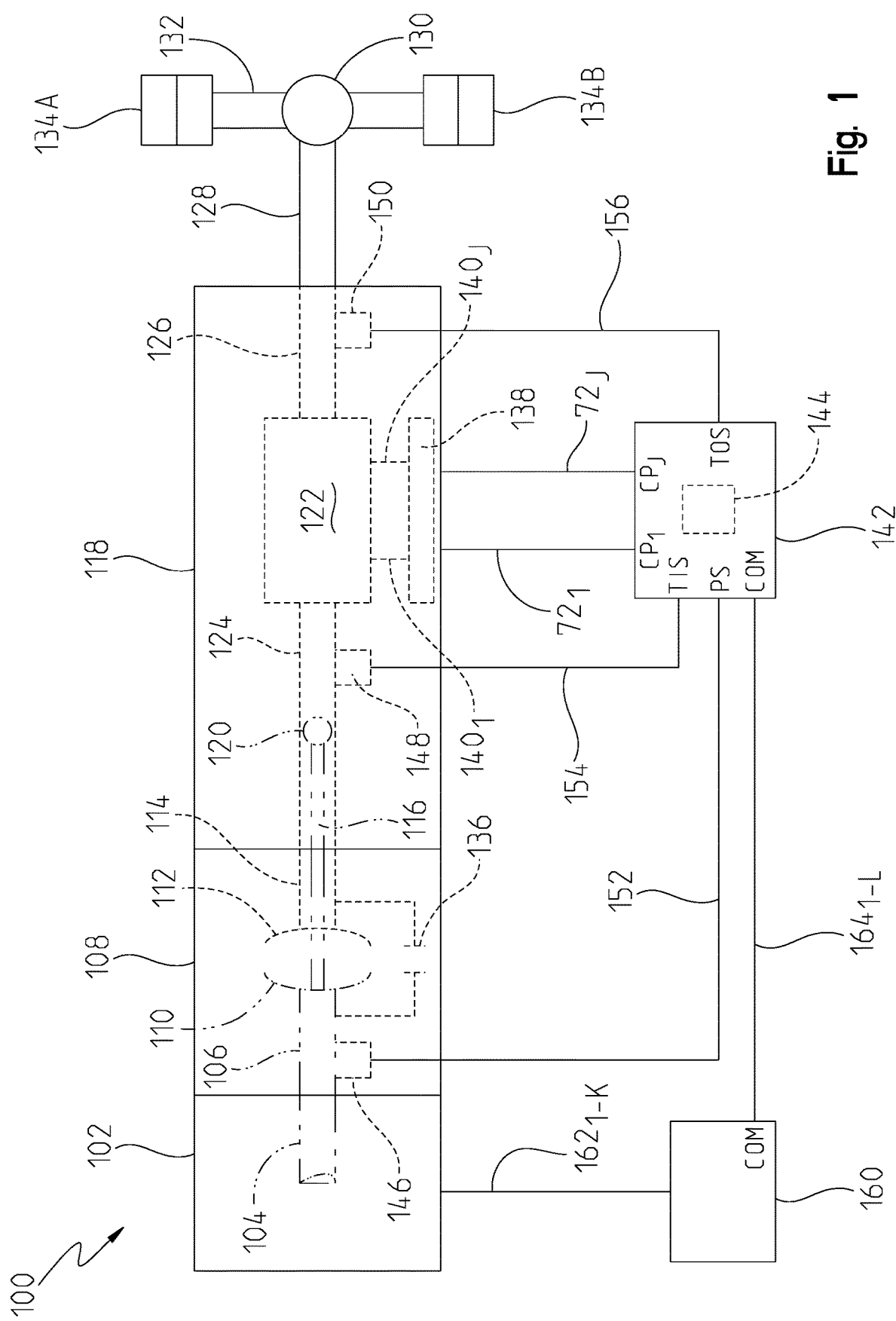
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108, disconnect clutch or other fluid coupling device. In the event a torque converter 108 is used, the input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

Although the embodiment of FIG. 1 is described as including a torque converter 108, the present disclosure is not limited to such an embodiment. Instead, in an alternative embodiment, a disconnect clutch may be used. In yet a further embodiment, a fluid coupling device may be used in place of the torque converter 108. Other devices and mechanisms besides a torque converter known to one skilled in the art may be used as well.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
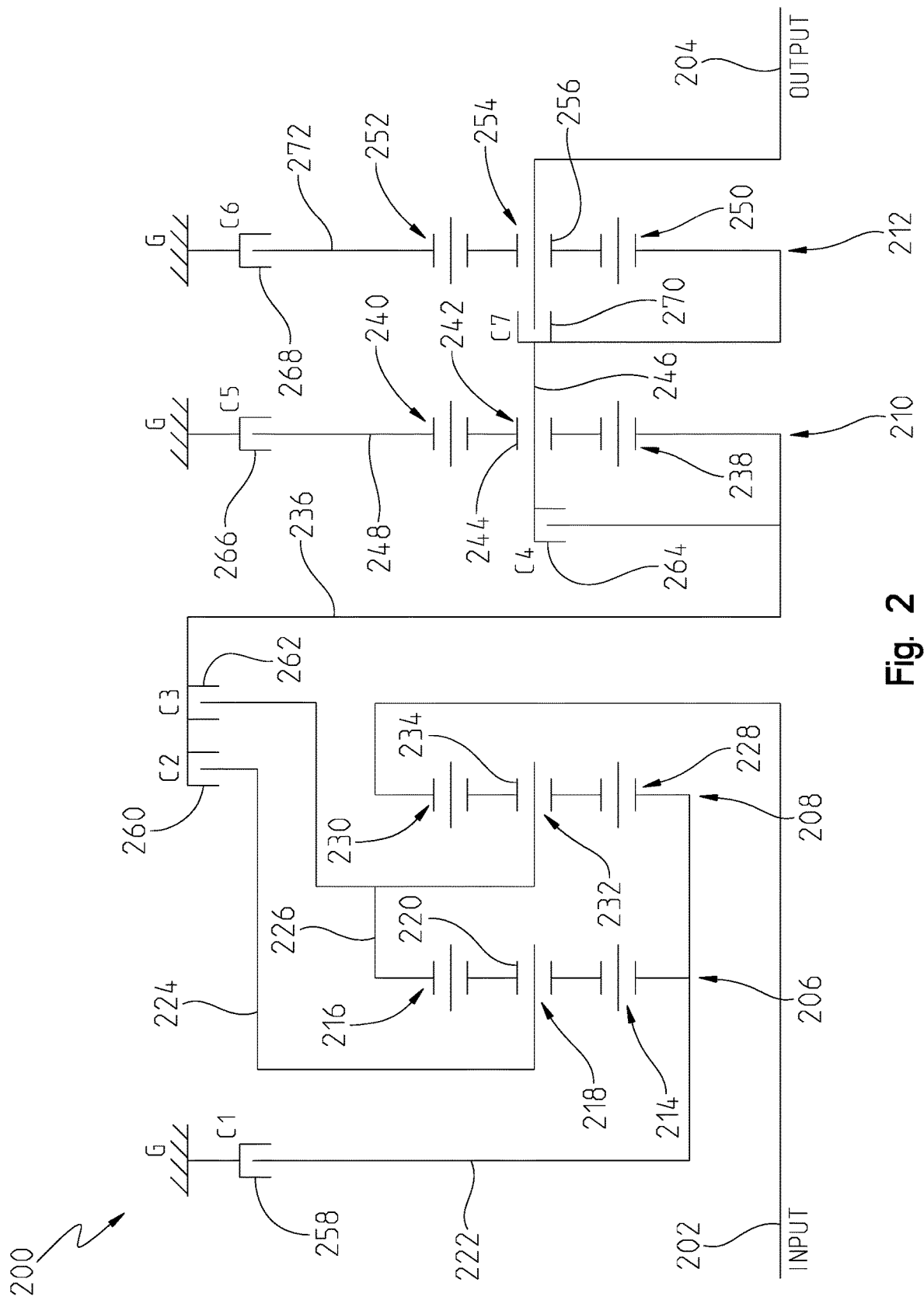
FIG. 2 is a diagrammatic view of a first embodiment of a multiple speed transmission.

Referring to FIG. 2, a schematic representation or stick diagram illustrates one embodiment of a multi-speed transmission 200 according to the present disclosure. The transmission 200 includes an input shaft 202 and an output shaft 204. In FIG. 2, the input shaft 202 and output shaft 204 can be disposed along the same axis or centerline of the transmission 200. In another aspect, the different shafts can be disposed along different axes or centerlines. In a further aspect (e.g., FIG. 4), the different shafts can be disposed parallel to one another, but along different axes or centerlines. Other aspect can be appreciated by one skilled in the art.

The transmission 200 can also include a plurality of planetary gearsets. In the illustrated embodiment of FIG. 2, the transmission 200 includes a first planetary gearset 206, a second planetary gearset 208, a third planetary gearset 210, and a fourth planetary gearset 212. Each planetary gearset can be referred to as a simple or compound planetary gearset. For example, in some aspects, one or more of the plurality of planetary gearsets can be formed as an idler planetary gearset. In FIG. 2, however, each of the planetary gearsets is formed as a simple planetary gearset.

One or more of the plurality of planetary gearsets can be arranged in different locations within the transmission 200, but for sake of simplicity and in this particular example only, the planetary gearsets are aligned in an axial direction consecutively in sequence (i.e., first, second, third, and fourth between the input and output shafts).

The transmission 200 may also include a plurality of torque-transmitting or gear-shifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 258, a fifth torque-transmitting mechanism 266, and a sixth torque-transmitting mechanism 268 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. The transmission 200 can include a second torque-transmitting mechanism 260, a third torque-transmitting mechanism 262, a fourth torque-transmitting mechanism 264, and a seventh torque-transmitting mechanism 270 that are configured to function as clutches. These can be shiftable friction-locked multi-disk clutches, shiftable form-locking claw or conical clutches, wet clutches, or any other known form of a clutch. With these seven torque-transmitting mechanisms, selective shifting of at least ten forward gears is possible.

The transmission 200 of FIG. 2 may also include up to nine different shafts, which is inclusive of the input shaft 202 and output shaft 204. Each of these shafts, designated as a first shaft 222, a second shaft 224, a third shaft 226, a fourth shaft 236, a fifth shaft 246, a sixth shaft 248, and a seventh shaft 272 are configured to be connected to one or more of the plurality of planetary gearsets or plurality of torque-transmitting mechanism between the input shaft 202 and output shaft 204.

In FIG. 2, the first planetary gearset 206 can include a first sun gear 214, a first ring gear 216, and a first carrier member 218 that rotatably supports a set of pinion gears 220. The second planetary gearset 208 can include a second sun gear 228, a second ring gear 230, and a second carrier member 232 that rotatably supports a set of pinion gears 234. The third planetary gearset 210 can include a third sun gear 238, a third ring gear 240, and a third carrier member 242 that rotatably supports a set of pinion gears 244. The fourth planetary gearset 212 can include a fourth sun gear 250, a fourth ring gear 252, and a fourth carrier member 254 that rotatably supports a set of pinion gears 256.

The transmission 200 is capable of transferring torque from the input shaft 202 to the output shaft 204 in at least ten forward gears or ratios. Each of the forward torque ratios can be attained by the selective engagement of one or more of the torque-transmitting mechanisms (i.e., torque-transmitting mechanisms 258, 260, 262, 264, 266, 268, and 270). Those skilled in the art will readily understand that a different speed ratio is associated with each torque ratio. Thus, at least ten forward speed ratios may be attained by the transmission 200.

As for the transmission 200, kinematic coupling of the first planetary gearset 206 is shown in FIG. 2. The first sun gear 214 is coupled to the first shaft 222 for common rotation therewith. The first carrier member 218 is coupled to the second shaft 224 for common rotation therewith. First ring gear 216 is coupled for common rotation with the third shaft 226.

With respect to the second planetary gearset 208, the second sun gear 228 is coupled to the first shaft 222 and first sun gear 214 for common rotation therewith. The second ring gear 230 is coupled to the input shaft 202 for common rotation therewith. Second pinion gears 234 are configured to intermesh with the second sun gear 228 and second ring gear 230, and the second carrier member 232 is coupled for common rotation with the third shaft 226 and the first ring gear 216.

The third sun gear 238 of the third planetary gearset 210 is coupled to the fourth shaft 236 for common rotation therewith. The third ring gear 240 is coupled to the sixth shaft 248 for common rotation therewith. Third pinion gears 244 are configured to intermesh with the third sun gear 238 and third ring gear 240, respectively. The third carrier member 242 is coupled for common rotation with the fifth shaft 246.

The kinematic relationship of the fourth planetary gearset 212 is such that the fourth sun gear 250 is coupled to the fifth shaft 246, which is also coupled to the third carrier member 242 for common rotation therewith. The fourth ring gear 252 is coupled to the seventh shaft 272 for common rotation therewith. The fourth pinion gears 256 are configured to intermesh with the fourth sun gear 250 and the fourth ring gear 252. The fourth carrier member 254 is coupled to the output shaft 204 for common rotation therewith.

With regards to the kinematic coupling of the seven torque-transmitting mechanisms to the previously described shafts, the multiple speed transmission 200 of FIG. 2 provides that the first torque-transmitting mechanism 258 is arranged within the power flow between the first shaft 222 and a housing G of the transmission 200. In this manner, the first torque-transmitting mechanism 258 is configured to act as a brake. The fifth torque-transmitting mechanism 266 is arranged within the power flow between the sixth shaft 248 and the housing G of the transmission 200. In this manner, the fifth torque-transmitting mechanism 266 is configured to act as a brake. The sixth torque-transmitting mechanism 268 is arranged within the power flow between the seventh shaft 272 and the housing G of the transmission 200. In this manner, the sixth torque-transmitting mechanism 268 is configured to act as a brake. In this embodiment of the transmission 200 therefore three of the seven torque-transmitting mechanisms are configured to act as a brake and the other four torque-transmitting mechanisms are configured to act as clutches.

The second torque-transmitting mechanism 260, for example, is arranged within the power flow between second shaft 224 and the fourth shaft 236. The third torque-transmitting mechanism 262 is arranged within the power flow between the third shaft 226 and the fourth shaft 236. The fourth torque-transmitting mechanism 264 is arranged within the power flow between the fourth shaft 236 and the fifth shaft 246. Moreover, the seventh torque-transmitting mechanism 270 is arranged within the power flow between the fifth shaft 246 and the output shaft 204.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 258 is selectively engageable to couple the first sun gear 214, the second sun gear 228, and the first shaft 222 to the housing G of the transmission 200. The second torque-transmitting mechanism 260 is selectively engageable to couple the first carrier member 218 and the second shaft 224 to the third sun gear 238 and the fourth shaft 236. Moreover, the third torque-transmitting mechanism 262 is selectively engageable to couple first ring gear 216, the second carrier member 232, and the third shaft 226 to the fourth shaft 236 and the third sun gear 238.

The fourth torque-transmitting mechanism 264 is selectively engageable to couple fourth shaft 236 and the third sun gear 238 to the third carrier member 242, the fourth sun gear 250, and the fifth shaft 246. The fifth torque-transmitting mechanism 266 is selectively engageable to couple the sixth shaft 248 and the third ring gear 240 to the housing G of the transmission 200. The sixth torque-transmitting mechanism 268 is selectively engageable to couple the fourth ring gear 252 and seventh shaft 272 to the housing G of the transmission 200. Lastly, the seventh torque-transmitting mechanism 270 is selectively engageable to couple the third carrier member 242, the fourth sun gear 250, and the fifth shaft 246 to the fourth carrier member 254 and the output shaft 204.

Figure 3:
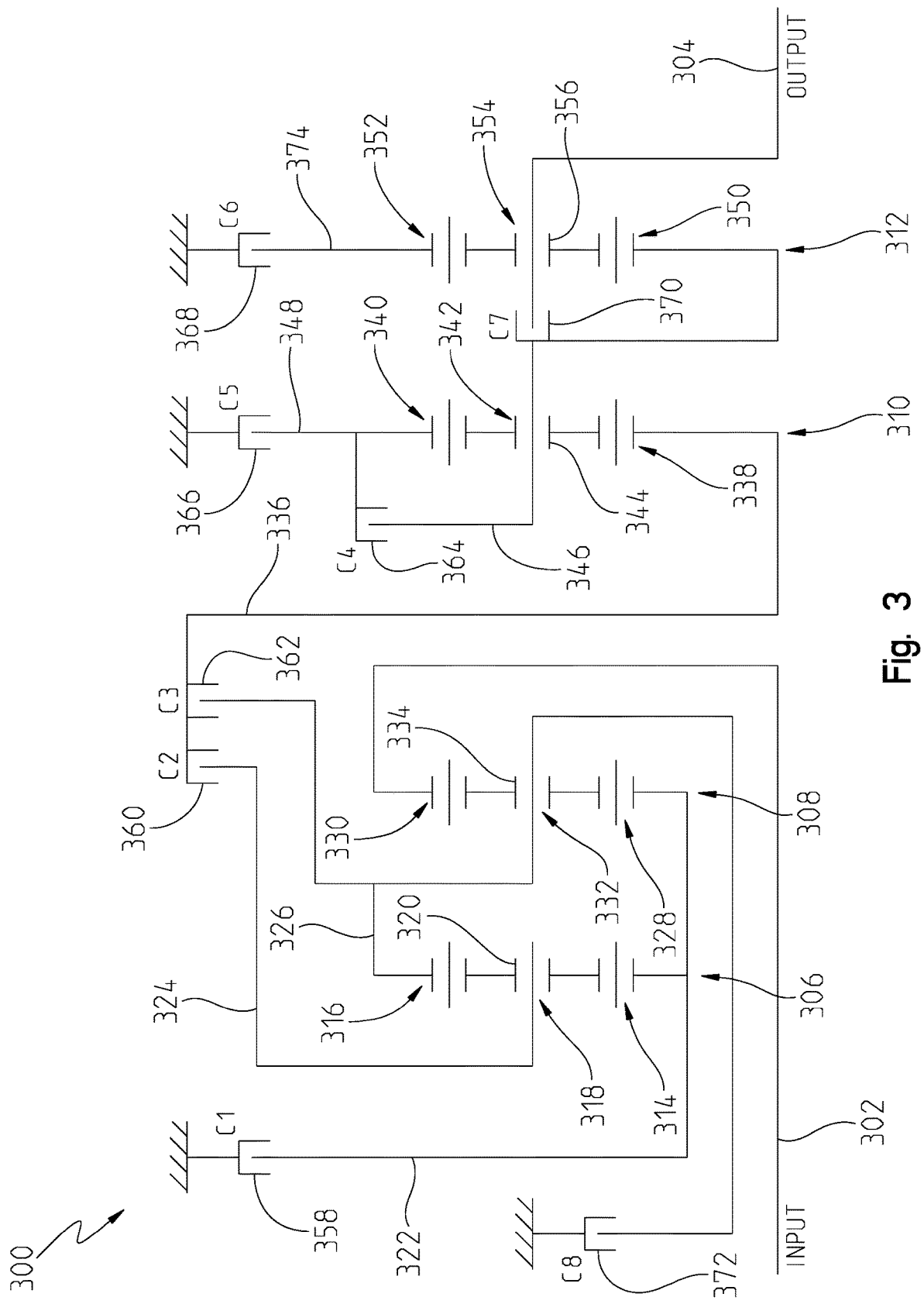
FIG. 3 is a diagrammatic view of a second embodiment of a multiple speed transmission.

Referring to FIG. 3, a schematic representation or stick diagram illustrates one embodiment of a multi-speed transmission 300 according to the present disclosure. The transmission 300 includes an input shaft 302 and an output shaft 304. The input shaft 302 and output shaft 304 can be disposed along the same axis or centerline of the transmission 300. In another aspect, the different shafts can be disposed along different axes or centerlines. In a further aspect, the different shafts can be disposed parallel to one another (e.g., see FIG. 5), but along different axes or centerlines. Other aspect can be appreciated by one skilled in the art.

The transmission 300 can also include a plurality of planetary gearsets. In the illustrated embodiment of FIG. 3, the transmission 300 includes a first planetary gearset 306, a second planetary gearset 308, a third planetary gearset 310, and a fourth planetary gearset 312. Each planetary gearset can be referred to as a simple or compound planetary gearset. For example, in some aspects, one or more of the plurality of planetary gearsets can be formed as an idler planetary gearset. In FIG. 3, each planetary gearset is a simple planetary gearset.

One or more of the plurality of planetary gearsets can be arranged in different locations within the transmission 300, but for sake of simplicity and in this particular example only, the planetary gearsets are aligned in an axial direction consecutively in sequence (i.e., first, second, third, and fourth between the input and output shafts).

The transmission 300 may also include a plurality of torque-transmitting or gear-shifting mechanisms. For example, one or more of these mechanisms can include a clutch or brake. In one aspect, each of the plurality of mechanisms is disposed within an outer housing of the transmission 300. In another aspect, however, one or more of the mechanisms may be disposed outside of the housing. Each of the plurality of mechanisms can be coupled to one or more of the plurality of planetary gearsets, which will be described further below.

In the embodiment of FIG. 3, the transmission 300 can include a first torque-transmitting mechanism 358, a fifth torque-transmitting mechanism 366, a sixth torque-transmitting mechanism 268, and an eighth torque-transmitting mechanism 372 that are configured to function as brakes (e.g., the torque-transmitting mechanism is fixedly coupled to the outer housing of the transmission 300). Each brake can be configured as a shiftable-friction-locked disk brake, shiftable friction-locked band brake, shiftable form-locking claw or conical brake, or any other type of known brake. The transmission 300 can include a second torque-transmitting mechanism 360, a third torque-transmitting mechanism 362, a fourth torque-transmitting mechanism 364, and a seventh torque-transmitting mechanism 370 that are configured to function as clutches. These can be shiftable friction-locked multi-disk clutches, shiftable form-locking claw or conical clutches, wet clutches, or any other known form of a clutch. With these eight torque-transmitting mechanisms, selective shifting of at least ten forward gears and at least one reverse gear is possible.

The transmission 300 of FIG. 3 may also include up to nine different shafts, which is inclusive of the input shaft 302 and output shaft 304. Each of these shafts, designated as a first shaft 322, a second shaft 324, a third shaft 326, a fourth shaft 336, a fifth shaft 346, a sixth shaft 348, and a seventh shaft 374, are configured to be connected to one or more of the plurality of planetary gearsets or plurality of torque-transmitting mechanism between the input shaft 302 and output shaft 304.

In FIG. 3, the first planetary gearset 306 can include a first sun gear 314, a first ring gear 316, and a first carrier member 318 that rotatably supports a set of pinion gears 320. The second planetary gearset 308 can include a second sun gear 328, a second ring gear 330, and a second carrier member 332 that rotatably supports a set of pinion gears 334. The third planetary gearset 310 can include a third sun gear 338, a third ring gear 340, and a third carrier member 342 that rotatably supports a set of pinion gears 344. The fourth planetary gearset 312 can include a fourth sun gear 350, a fourth ring gear 352, and a fourth carrier member 354 that rotatably supports a set of pinion gears 356.

The transmission 300 is capable of transferring torque from the input shaft 302 to the output shaft 304 in at least ten forward gears or ratios and at least one reverse gear or ratio. In a related aspect, the transmission 300 may be capable of achieving two or more reverse gears or ratios. Each of the forward torque and reverse torque ratios can be attained by the selective engagement of one or more of the torque-transmitting mechanisms (i.e., torque-transmitting mechanisms 358, 360, 362, 364, 366, 368, 370, and 372). Those skilled in the art will readily understand that a different speed ratio is associated with each torque ratio. Thus, at least ten forward speed ratios and at least one reverse speed ratio may be attained by transmission 300.

As for the transmission 300, kinematic coupling of the first planetary gearset 306 is shown in FIG. 3. The first sun gear 314 is coupled to the first shaft 322 for common rotation therewith. The first carrier member 318 is coupled to the second shaft 324 for common rotation therewith. First ring gear 316 is coupled for common rotation with the third shaft 326.

With respect to the second planetary gearset 308, the second sun gear 328 is coupled to the first shaft 322 and first sun gear 314 for common rotation therewith. The second ring gear 330 is coupled to the input shaft 302 for common rotation therewith. The second carrier member 332 is coupled for common rotation with the third shaft 326 and the first ring gear 326.

The third sun gear 338 of the third planetary gearset 310 is coupled to the fourth shaft 336 for common rotation therewith. The third ring gear 340 is coupled to the sixth shaft 348 for common rotation therewith. Third pinion gears 344 are configured to intermesh with the third sun gear 338 and third ring gear 340, respectively. The third carrier member 342 is coupled for common rotation with the fifth shaft 346.

The kinematic relationship of the fourth planetary gearset 312 is such that the fourth sun gear 350 is coupled to the fifth shaft 346 and the third carrier member 342 for common rotation therewith. The fourth ring gear 352 is coupled to the seventh shaft 374 for common rotation therewith. The fourth pinion gears 356 are configured to intermesh with the fourth sun gear 350 and the fourth ring gear 352. The fourth carrier member 354 is coupled to the output shaft 304 for common rotation therewith.

With regards to the kinematic coupling of the eight torque-transmitting mechanisms to the previously described shafts, the multiple speed transmission 300 of FIG. 3 provides that the first torque-transmitting mechanism 358 is arranged within the power flow between the first shaft 322 and a housing G of the transmission 300. In this manner, the first torque-transmitting mechanism 358 is configured to act as a brake. The fifth torque-transmitting mechanism 366 is arranged within the power flow between the sixth shaft 348 and the housing G of the transmission 300. In this manner, the fifth torque-transmitting mechanism 366 is configured to act as a brake. The sixth torque-transmitting mechanism 368 is arranged within the power flow between the seventh shaft 374 and the housing G of the transmission 300. In this manner, the sixth torque-transmitting mechanism 360 is configured to act as a brake. The eighth torque-transmitting mechanism 372 is arranged within the power flow between the third shaft 326 and the housing G of the transmission 300. In this manner, the eighth torque-transmitting mechanism 372 is configured to act as a brake. In this embodiment of the transmission 300 therefore four of the eight torque-transmitting mechanisms are configured to act as a brake and the other four torque-transmitting mechanisms are configured to act as clutches.

The second torque-transmitting mechanism 360, for example, is arranged within the power flow between the second shaft 324 and the fourth shaft 336. The third torque-transmitting mechanism 362 is arranged within the power flow between the third shaft 326 and the fourth shaft 336. The fourth torque-transmitting mechanism 364 is arranged within the power flow between the fifth shaft 346 and the sixth shaft 348. Lastly, the seventh torque-transmitting mechanism 370 is arranged within the power flow between the fifth shaft 346 and the output shaft 304.

The kinematic couplings of the embodiment in FIG. 3 can further be described with respect to the selective engagement of the torque-transmitting mechanisms with respect to one or more components of the plurality of planetary gearsets. For example, in the transmission 300, the first torque-transmitting mechanism 358 is selectively engageable to couple the first sun gear 314, the second sun gear 328, and the first shaft 322 to the housing G of the transmission 300. The second torque-transmitting mechanism 360 is selectively engageable to couple the first carrier member 318 and the second shaft 324 to the fourth shaft 336 and the third sun gear 338. The third torque-transmitting mechanism 362 is selectively engageable to couple third shaft 326, the first ring gear 316, and the second carrier member 332 to the fourth shaft 336 and the third sun gear 338. The fourth torque-transmitting mechanism 364 is selectively engageable to couple fifth shaft 346, the third carrier member 342, and the fourth sun gear 350 to the third ring gear 340 and the sixth shaft 348.

The fifth torque-transmitting mechanism 366 is selectively engageable to couple the third ring gear 340 and the sixth shaft 348 to the housing G of the transmission 300. The sixth torque-transmitting mechanism 368 is selectively engageable to couple the fourth ring gear 352 and the seventh shaft 374 to the housing G of the transmission 300. The seventh torque-transmitting mechanism 370 is selectively engageable to couple third carrier member 342 and the fifth shaft 346 to the fourth carrier member 354 and the output shaft 304. Lastly, the eighth torque-transmitting mechanism 372 is selectively engageable to couple the first ring gear 316, the second carrier member 332, and the third shaft 326 to the housing G of the transmission 300.

Figure 4:
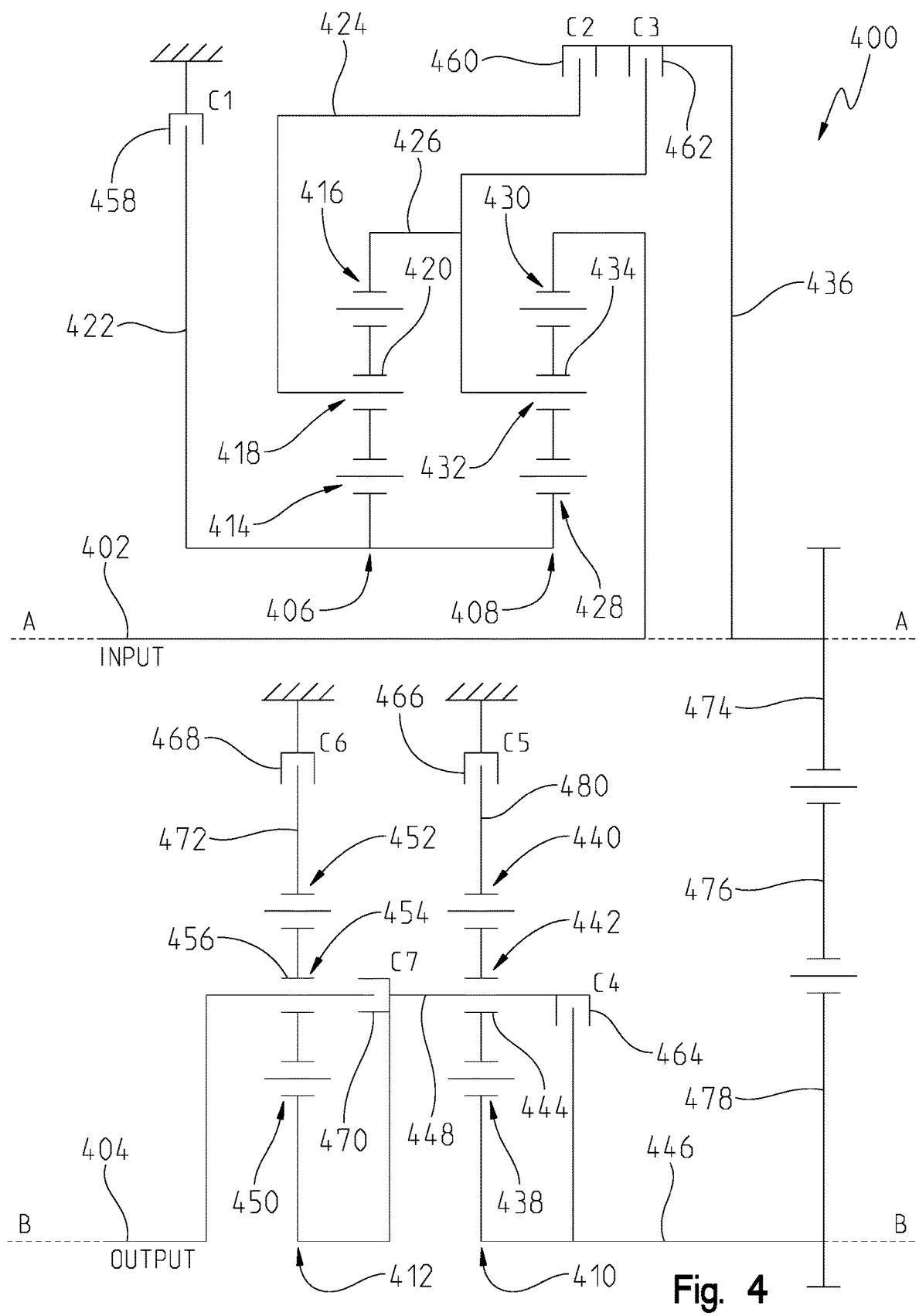
FIG. 4 is a diagrammatic view of a third embodiment of a multiple speed transmission.

Referring to FIG. 4, a schematic representation or stick diagram illustrates a further embodiment of a multi-speed transmission 400 according to the present disclosure. The transmission 400 includes an input shaft 402 and an output shaft 404. In FIG. 4, the input shaft 402 and output shaft 404 can be disposed parallel to one another. For instance, the input shaft 402 may be positioned along a first axis or centerline, A-A, and the output shaft 404 may be positioned along a second axis or centerline B-B. In this example, the first axis and second axis are offset and parallel to one another. In this manner, the transmission 400 may be packaged differently from the transmission 200 in FIG. 2 and the transmission 300 in FIG. 3.

Torque may transfer through the transmission 400 from the input shaft 402 and output shaft 404 even though both shafts are located on different axes or centerlines. For example, the two axes may be mechanically coupled to one another via two or more gears. As shown in FIG. 4, a first gear 474 may be coupled along the first axis A-A and a second gear 478 may be coupled along the second axis B-B. An intermediate or third gear 476 may be coupled between the first and second gears. For example, the first gear 474, the second gear 478, and the third gear 476 may be spur gears that intermesh in an engaging manner with one another to transfer torque between the two axes or centerlines.

In FIG. 4, the transmission 400 can also include a plurality of planetary gearsets. For example, the transmission 400 may include a first planetary gearset 406, a second planetary gearset 408, a third planetary gearset 410, and a fourth planetary gearset 412. Each planetary gearset can be referred to as a simple or compound planetary gearset. For example, in some aspects, one or more of the plurality of planetary gearsets can be formed as an idler planetary gearset. In FIG. 4, however, each of the planetary gearsets is formed as a simple planetary gearset.

In the illustrated embodiment of FIG. 4, the first planetary gearset 406 and the second planetary gearset 408 may be positioned on the first axis A-A, whereas the third planetary gearset 410 and fourth planetary gearset 412 may be positioned on the second axis B-B. This, however, is only one example of how this embodiment may be structured. In a different embodiment, a single planetary gearset may be positioned on either the first axis or second axis, and the remaining planetary gearsets may be positioned on the other axis. Thus, for sake of this disclosure, there may be any number of planetary gearsets positioned on either the first or second axis.

One or more of the plurality of planetary gearsets can be arranged in different sequential orders within the transmission 400, but for sake of simplicity and in this particular example only, the planetary gearsets are aligned consecutively in sequence (i.e., first, second, third, and fourth between the input and output shafts).

The transmission 400 may also include a plurality of torque-transmitting or gear-shifting mechanisms. For example, one or more of these mechanisms can include a clutch or brake. In one aspect, each of the plurality of mechanisms is disposed within an outer housing of the transmission 400. In another aspect, however, one or more of the mechanisms may be disposed outside of the housing. Each of the plurality of mechanisms can be coupled to one or more of the plurality of planetary gearsets, which will be described further below.

In the embodiment of FIG. 4, the transmission 400 can include a first torque-transmitting mechanism 458, a fifth torque-transmitting mechanism 466, and a sixth torque-transmitting mechanism 468 that are configured to function as brakes (e.g., the torque-transmitting mechanism is fixedly coupled to the outer housing of the transmission 400). Each brake can be configured as a shiftable-friction-locked disk brake, shiftable friction-locked band brake, shiftable form-locking claw or conical brake, or any other type of known brake. The transmission 400 can include a second torque-transmitting mechanism 460, a third torque-transmitting mechanism 462, a fourth torque-transmitting mechanism 464, and a seventh torque-transmitting mechanism 470 that are configured to function as clutches. These can be shiftable friction-locked multi-disk clutches, shiftable form-locking claw or conical clutches, wet clutches, or any other known form of a clutch. With these seven torque-transmitting mechanisms, selective shifting of at least ten forward gears is possible.

The transmission 400 of FIG. 4 may also include up to ten different shafts, which is inclusive of the input shaft 402 and output shaft 404. Each of these shafts, designated as a first shaft 422, a second shaft 424, a third shaft 426, a fourth shaft 436, a fifth shaft 446, a sixth shaft 448, a seventh shaft 472, and an eighth shaft 480 are configured to be connected to one or more of the plurality of planetary gearsets or plurality of torque-transmitting mechanism between the input shaft 402 and output shaft 404.

In FIG. 4, the first planetary gearset 406 can include a first sun gear 414, a first ring gear 416, and a first carrier member 418 that rotatably supports a set of pinion gears 420. The second planetary gearset 408 can include a second sun gear 428, a second ring gear 430, and a second carrier member 432 that rotatably supports a set of pinion gears 434. The third planetary gearset 410 can include a third sun gear 438, a third ring gear 440, and a third carrier member 442 that rotatably supports a set of pinion gears 444. The fourth planetary gearset 412 can include a fourth sun gear 450, a fourth ring gear 452, and a fourth carrier member 454 that rotatably supports a set of pinion gears 456.

The transmission 400 is capable of transferring torque from the input shaft 402 to the output shaft 404 in at least ten forward gears or ratios. Each of the forward torque ratios can be attained by the selective engagement of one or more of the torque-transmitting mechanisms (i.e., torque-transmitting mechanisms 458, 460, 462, 464, 466, 468, and 470). Those skilled in the art will readily understand that a different speed ratio is associated with each torque ratio. Thus, at least ten forward speed ratios may be attained by the transmission 400.

As for the transmission 400, kinematic coupling of the first planetary gearset 406 is shown in FIG. 4. The first sun gear 414 is coupled to the first shaft 422 for common rotation therewith. The first carrier member 418 is coupled to the second shaft 424 for common rotation therewith. First ring gear 416 is coupled for common rotation with the third shaft 426.

With respect to the second planetary gearset 408, the second sun gear 428 is coupled to the first shaft 422 and first sun gear 414 for common rotation therewith. The second ring gear 430 is coupled to the input shaft 402 for common rotation therewith. Second pinion gears 434 are configured to intermesh with the second sun gear 428 and second ring gear 430, and the second carrier member 432 is coupled for common rotation with the third shaft 426 and the first ring gear 416.

The third sun gear 438 of the third planetary gearset 410 is coupled to the fifth shaft 446 for common rotation therewith. The third ring gear 440 is coupled to the eighth shaft 480 for common rotation therewith. Third pinion gears 444 are configured to intermesh with the third sun gear 438 and third ring gear 440, respectively. The third carrier member 442 is coupled for common rotation with the sixth shaft 446.

The kinematic relationship of the fourth planetary gearset 412 is such that the fourth sun gear 450 is coupled to the sixth shaft 448, which is also coupled to the third carrier member 442 for common rotation therewith. The fourth ring gear 452 is coupled to the seventh shaft 472 for common rotation therewith. The fourth pinion gears 456 are configured to intermesh with the fourth sun gear 450 and the fourth ring gear 452. The fourth carrier member 454 is coupled to the output shaft 404 for common rotation therewith.

With regards to the kinematic coupling of the seven torque-transmitting mechanisms to the previously described shafts, the multiple speed transmission 400 of FIG. 4 provides that the first torque-transmitting mechanism 458 is arranged within the power flow between the first shaft 422 and a housing G of the transmission 400. In this manner, the first torque-transmitting mechanism 458 is configured to act as a brake. The fifth torque-transmitting mechanism 466 is arranged within the power flow between the eighth shaft 480 and the housing G of the transmission 400. In this manner, the fifth torque-transmitting mechanism 466 is configured to act as a brake. The sixth torque-transmitting mechanism 468 is arranged within the power flow between the seventh shaft 472 and the housing G of the transmission 400. In this manner, the sixth torque-transmitting mechanism 468 is configured to act as a brake. In this embodiment of the transmission 400 therefore three of the seven torque-transmitting mechanisms are configured to act as a brake and the other four torque-transmitting mechanisms are configured to act as clutches.

The second torque-transmitting mechanism 460, for example, is arranged within the power flow between second shaft 424 and the fourth shaft 436. The third torque-transmitting mechanism 462 is arranged within the power flow between the third shaft 426 and the fourth shaft 436. The fourth torque-transmitting mechanism 464 is arranged within the power flow between the fifth shaft 436 and the sixth shaft 448. Moreover, the seventh torque-transmitting mechanism 470 is arranged within the power flow between the sixth shaft 448 and the output shaft 404.

The kinematic couplings of the embodiment in FIG. 4 can further be described with respect to the selective engagement of the torque-transmitting mechanisms with respect to one or more components of the plurality of planetary gearsets. For example, in the transmission 400, the first torque-transmitting mechanism 458 is selectively engageable to couple the first sun gear 414, the second sun gear 428, and the first shaft 422 to the housing G of the transmission 400. The second torque-transmitting mechanism 460 is selectively engageable to couple the first carrier member 418 and the second shaft 424 to the fourth shaft 236. Moreover, the third torque-transmitting mechanism 462 is selectively engageable to couple first ring gear 416, the second carrier member 432, and the third shaft 426 to the fourth shaft 436.

The fourth torque-transmitting mechanism 464 is selectively engageable to couple fifth shaft 446 and the third sun gear 438 to the third carrier member 442, the fourth sun gear 450, and the sixth shaft 448. The fifth torque-transmitting mechanism 466 is selectively engageable to couple the eighth shaft 480 and the third ring gear 440 to the housing G of the transmission 400. The sixth torque-transmitting mechanism 468 is selectively engageable to couple the fourth ring gear 452 and seventh shaft 472 to the housing G of the transmission 200. Lastly, the seventh torque-transmitting mechanism 470 is selectively engageable to couple the third carrier member 442, the fourth sun gear 450, and the sixth shaft 448 to the fourth carrier member 454 and the output shaft 404.

In this embodiment, the input shaft 402, the first shaft 422, the second shaft 424, the third shaft 426, and the fourth shaft 436 are located on the first axis or centerline A-A, and the output shaft 404, the fifth shaft 246, the sixth shaft 248, the seventh shaft 272, and the eighth shaft 280 are positioned along the second axis B-B. The fourth shaft 436 and the fifth shaft 446 are coupled to another via the first gear 474, the second gear 478, and the third gear 476.

Figure 5:
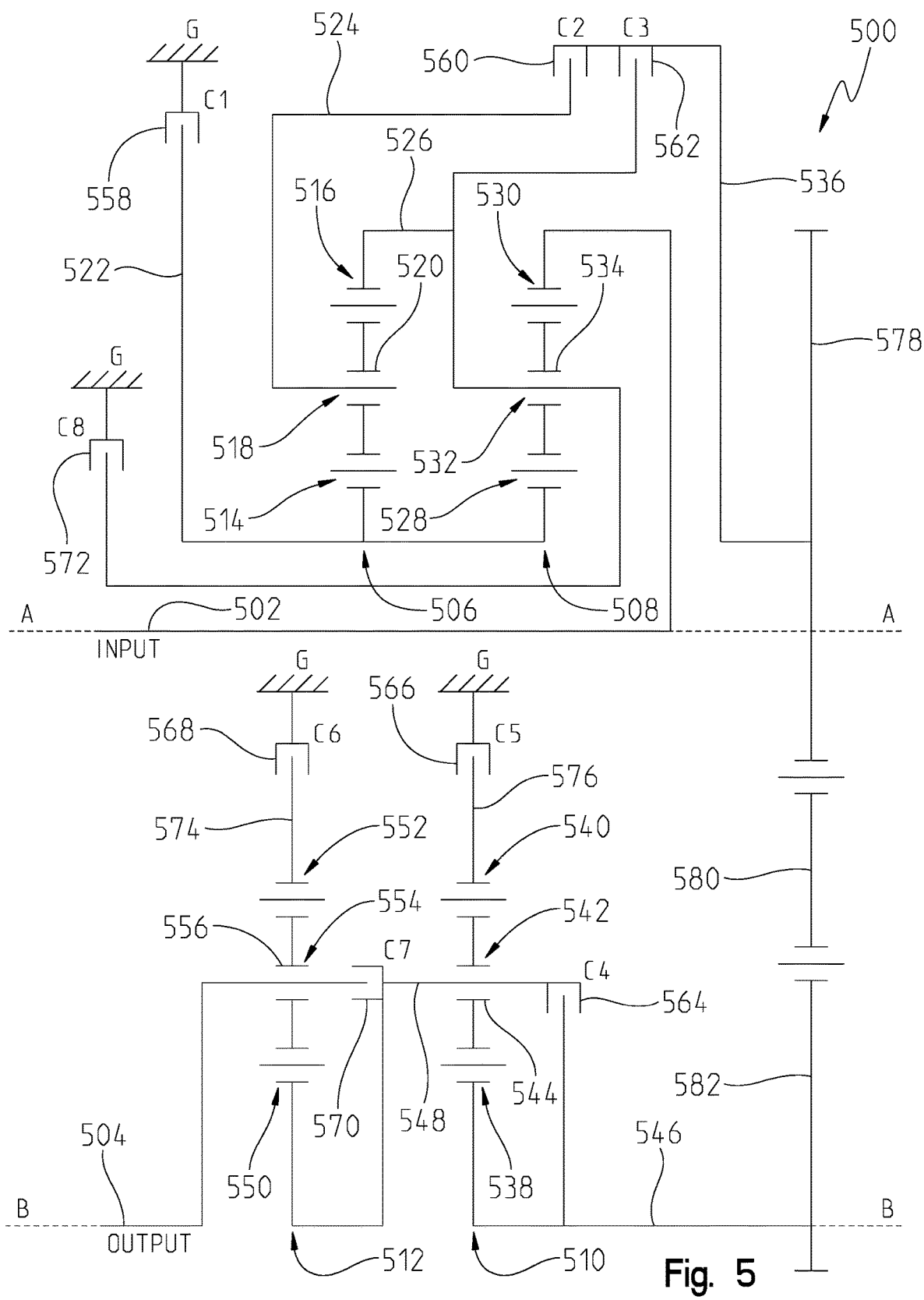
FIG. 5 is a diagrammatic view of a fourth embodiment of a multiple speed transmission.

Referring to FIG. 5, a schematic representation or stick diagram illustrates another embodiment of a multi-speed transmission 500 according to the present disclosure. The transmission 500 includes an input shaft 502 and an output shaft 504. In FIG. 5, the input shaft 502 and output shaft 504 can be disposed parallel to one another. For instance, the input shaft 502 may be positioned along a first axis or centerline, A-A, and the output shaft 504 may be positioned along a second axis or centerline B-B. In this example, the first axis and second axis are offset and parallel to one another. In this manner, the transmission 500 may be packaged differently from the transmission 200 in FIG. 2 and the transmission 300 in FIG. 3.

Torque may transfer through the transmission 500 from the input shaft 502 and output shaft 504 even though both shafts are located on different axes or centerlines. For example, the two axes may be mechanically coupled to one another via two or more gears. As shown in FIG. 5, a first gear 578 may be coupled along the first axis A-A and a second gear 582 may be coupled along the second axis B-B. An intermediate or third gear 580 may be coupled between the first and second gears. For example, the first gear 578, the second gear 582, and the third gear 580 may be spur gears that intermesh in an engaging manner with one another to transfer torque between the two axes or centerlines.

The transmission 500 can also include a plurality of planetary gearsets. In the illustrated embodiment of FIG. 5, the transmission 500 includes a first planetary gearset 506, a second planetary gearset 508, a third planetary gearset 510, and a fourth planetary gearset 512. Each planetary gearset can be referred to as a simple or compound planetary gearset. For example, in some aspects, one or more of the plurality of planetary gearsets can be formed as an idler planetary gearset. In FIG. 5, each planetary gearset is a simple planetary gearset.

In the illustrated embodiment of FIG. 5, the first planetary gearset 506 and the second planetary gearset 508 may be positioned on the first axis A-A, whereas the third planetary gearset 510 and fourth planetary gearset 512 may be positioned on the second axis B-B. This, however, is only one example of how this embodiment may be structured. In a different embodiment, a single planetary gearset may be positioned on either the first axis or second axis, and the remaining planetary gearsets may be positioned on the other axis. Thus, for sake of this disclosure, there may be any number of planetary gearsets positioned on either the first or second axis.

One or more of the plurality of planetary gearsets can be arranged in different sequential orders within the transmission 500, but for sake of simplicity and in this particular example only, the planetary gearsets are aligned consecutively in sequence (i.e., first, second, third, and fourth between the input and output shafts).

The transmission 500 may also include a plurality of torque-transmitting or gear-shifting mechanisms. For example, one or more of these mechanisms can include a clutch or brake. In one aspect, each of the plurality of mechanisms is disposed within an outer housing of the transmission 500. In another aspect, however, one or more of the mechanisms may be disposed outside of the housing. Each of the plurality of mechanisms can be coupled to one or more of the plurality of planetary gearsets, which will be described further below.

In the embodiment of FIG. 5, the transmission 500 can include a first torque-transmitting mechanism 558, a fifth torque-transmitting mechanism 566, a sixth torque-transmitting mechanism 268, and an eighth torque-transmitting mechanism 572 that are configured to function as brakes (e.g., the torque-transmitting mechanism is fixedly coupled to the outer housing of the transmission 500). Each brake can be configured as a shiftable-friction-locked disk brake, shiftable friction-locked band brake, shiftable form-locking claw or conical brake, or any other type of known brake. The transmission 500 can include a second torque-transmitting mechanism 560, a third torque-transmitting mechanism 562, a fourth torque-transmitting mechanism 564, and a seventh torque-transmitting mechanism 570 that are configured to function as clutches. These can be shiftable friction-locked multi-disk clutches, shiftable form-locking claw or conical clutches, wet clutches, or any other known form of a clutch. With these eight torque-transmitting mechanisms, selective shifting of at least ten forward gears and at least one reverse gear is possible.

The transmission 500 of FIG. 5 may also include up to ten different shafts, which is inclusive of the input shaft 502 and output shaft 504. Each of these shafts, designated as a first shaft 522, a second shaft 524, a third shaft 526, a fourth shaft 536, a fifth shaft 546, a sixth shaft 548, a seventh shaft 274, and an eighth shaft 276, are configured to be connected to one or more of the plurality of planetary gearsets or plurality of torque-transmitting mechanism between the input shaft 502 and output shaft 504.

In FIG. 5, the first planetary gearset 506 can include a first sun gear 514, a first ring gear 516, and a first carrier member 518 that rotatably supports a set of pinion gears 520. The second planetary gearset 508 can include a second sun gear 528, a second ring gear 530, and a second carrier member 532 that rotatably supports a set of pinion gears 534. The third planetary gearset 510 can include a third sun gear 538, a third ring gear 540, and a third carrier member 542 that rotatably supports a set of pinion gears 544. The fourth planetary gearset 512 can include a fourth sun gear 550, a fourth ring gear 552, and a fourth carrier member 554 that rotatably supports a set of pinion gears 556.

The transmission 500 is capable of transferring torque from the input shaft 502 to the output shaft 504 in at least ten forward gears or ratios and at least one reverse gear or ratio. In a related aspect, the transmission 500 may be capable of achieving two or more reverse gears or ratios. Each of the forward torque and reverse torque ratios can be attained by the selective engagement of one or more of the torque-transmitting mechanisms (i.e., torque-transmitting mechanisms 558, 560, 562, 564, 566, 568, 570, and 572). Those skilled in the art will readily understand that a different speed ratio is associated with each torque ratio. Thus, at least ten forward speed ratios and at least one reverse speed ratio may be attained by transmission 500.

As for the transmission 500, kinematic coupling of the first planetary gearset 506 is shown in FIG. 5. The first sun gear 514 is coupled to the first shaft 522 for common rotation therewith. The first carrier member 518 is coupled to the second shaft 524 for common rotation therewith. First ring gear 516 is coupled for common rotation with the third shaft 526.

With respect to the second planetary gearset 508, the second sun gear 528 is coupled to the first shaft 522 and first sun gear 514 for common rotation therewith. The second ring gear 530 is coupled to the input shaft 502 for common rotation therewith. The second carrier member 532 is coupled for common rotation with the third shaft 526 and the first ring gear 516.

The third sun gear 538 of the third planetary gearset 510 is coupled to the fifth shaft 546 for common rotation therewith. The third ring gear 540 is coupled to the eighth shaft 576 for common rotation therewith. Third pinion gears 544 are configured to intermesh with the third sun gear 538 and third ring gear 540, respectively. The third carrier member 542 is coupled for common rotation with the sixth shaft 548.

The kinematic relationship of the fourth planetary gearset 512 is such that the fourth sun gear 550 is coupled to the sixth shaft 548 and the third carrier member 542 for common rotation therewith. The fourth ring gear 552 is coupled to the seventh shaft 574 for common rotation therewith. The fourth pinion gears 556 are configured to intermesh with the fourth sun gear 550 and the fourth ring gear 552. The fourth carrier member 554 is coupled to the output shaft 504 for common rotation therewith.

With regards to the kinematic coupling of the eight torque-transmitting mechanisms to the previously described shafts, the multiple speed transmission 500 of FIG. 5 provides that the first torque-transmitting mechanism 558 is arranged within the power flow between the first shaft 522 and a housing G of the transmission 500. In this manner, the first torque-transmitting mechanism 558 is configured to act as a brake. The fifth torque-transmitting mechanism 566 is arranged within the power flow between the eighth shaft 576 and the housing G of the transmission 500. In this manner, the fifth torque-transmitting mechanism 566 is configured to act as a brake. The sixth torque-transmitting mechanism 568 is arranged within the power flow between the seventh shaft 374 and the housing G of the transmission 500. In this manner, the sixth torque-transmitting mechanism 560 is configured to act as a brake. The eighth torque-transmitting mechanism 572 is arranged within the power flow between the third shaft 526 and the housing G of the transmission 500. In this manner, the eighth torque-transmitting mechanism 572 is configured to act as a brake. In this embodiment of the transmission 500 therefore four of the eight torque-transmitting mechanisms are configured to act as a brake and the other four torque-transmitting mechanisms are configured to act as clutches.

The second torque-transmitting mechanism 560, for example, is arranged within the power flow between the second shaft 524 and the fourth shaft 536. The third torque-transmitting mechanism 562 is arranged within the power flow between the third shaft 526 and the fourth shaft 536. The fourth torque-transmitting mechanism 564 is arranged within the power flow between the fifth shaft 546 and the sixth shaft 548. Lastly, the seventh torque-transmitting mechanism 570 is arranged within the power flow between the sixth shaft 548 and the output shaft 504.

The kinematic couplings of the embodiment in FIG. 5 can further be described with respect to the selective engagement of the torque-transmitting mechanisms with respect to one or more components of the plurality of planetary gearsets. For example, in the transmission 500, the first torque-transmitting mechanism 558 is selectively engageable to couple the first sun gear 514, the second sun gear 528, and the first shaft 522 to the housing G of the transmission 500. The second torque-transmitting mechanism 560 is selectively engageable to couple the first carrier member 518 and the second shaft 524 to the fourth shaft 536. The third torque-transmitting mechanism 562 is selectively engageable to couple third shaft 526, the first ring gear 516, and the second carrier member 532 to the fourth shaft 536. The fourth torque-transmitting mechanism 564 is selectively engageable to couple fifth shaft 546 and the third sun gear 538 to the third carrier member 542, the fourth sun gear 550 and the sixth shaft 548.

The fifth torque-transmitting mechanism 566 is selectively engageable to couple the third ring gear 540 and the eighth shaft 576 to the housing G of the transmission 500. The sixth torque-transmitting mechanism 568 is selectively engageable to couple the fourth ring gear 552 and the seventh shaft 374 to the housing G of the transmission 500. The seventh torque-transmitting mechanism 570 is selectively engageable to couple third carrier member 542, the fourth sun gear 550 and the sixth shaft 548 to the fourth carrier member 554 and the output shaft 504. Lastly, the eighth torque-transmitting mechanism 572 is selectively engageable to couple the first ring gear 516, the second carrier member 532, and the third shaft 526 to the housing G of the transmission 500.

In this embodiment, the input shaft 502, the first shaft 522, the second shaft 524, the third shaft 526, and the fourth shaft 536 are located on the first axis or centerline A-A, and the output shaft 504, the fifth shaft 546, the sixth shaft 548, the seventh shaft 574, and the eighth shaft 576 are positioned along the second axis B-B. The fourth shaft 536 and the fifth shaft 546 are coupled to another via the first gear 578, the second gear 582, and the third gear 580.

Referring to FIG. 6, one example of a truth table is shown representing a state of engagement of various torque transmitting mechanisms in each of the available forward speeds or gear ratios of the transmissions illustrated in FIGS. 2 and 4. It is to be understood that FIG. 6 is only one example of any number of truth tables possible for achieving at least ten forward ratios, and one skilled in the art is capable of configuring diameters, gear tooth counts, and gear configurations to achieve other ratios.

In the example of FIG. 6, there is no reverse speed or ratio. This may be applicable for a certain type of military application where the transmission operates in neutral and various forward ranges.

In neutral (Neu), none of the torque-transmitting mechanisms carry torque. One or more of the torque-transmitting mechanisms, however, may be engaged in neutral but not carrying torque.

A first forward ratio (shown as F1) in the table of FIG. 6 is achieved by engaging the first torque-transmitting mechanism, the second torque-transmitting mechanism, the fifth torque-transmitting mechanism, and the sixth torque-transmitting mechanism. Thus, in F1 or low, the three brakes and one clutch are engaged. In FIG. 2, for example, the first torque-transmitting mechanism 258, the second torque-transmitting mechanism 260, the fifth torque-transmitting mechanism 266, and the sixth torque-transmitting mechanism 268 are engaged.

In a second or subsequent forward ratio, indicated as F2 in FIG. 6, the first torque-transmitting mechanism, the third torque-transmitting mechanism, the fifth torque-transmitting mechanism, and sixth torque-transmitting mechanism are selectively engaged. Therefore, when transitioning between the first forward ratio and the second forward ratio, the second torque-transmitting mechanism is released and the third torque-transmitting mechanism is engaged.

In a third or subsequent forward ratio, indicated as F3 in FIG. 6, the second, third, fifth, and sixth torque-transmitting mechanisms are engaged. To transition from the second forward ratio to the third forward ratio, for example, the first torque-transmitting mechanism is released and the second torque-transmitting mechanism is engaged.

In a fourth or the next subsequent forward ratio, indicated as F4 in FIG. 6, the first, second, fifth and seventh torque-transmitting mechanisms are engaged. Thus, to transition from the third forward ratio and upshift to the fourth forward ratio, the third and sixth torque-transmitting mechanisms are released and the first and seventh torque-transmitting mechanisms are engaged.

In a fifth or the next subsequent forward ratio, indicated as F5 in FIG. 6, the first, second, fourth, and sixth torque-transmitting mechanisms are engaged. Thus, to transition from the fourth forward ratio and upshift to the fifth forward ratio, the fifth and seventh torque-transmitting mechanisms are released and the fourth and sixth torque-transmitting mechanisms are engaged.

In a sixth or the next subsequent forward ratio, indicated as F6 in FIG. 6, the first, third, fifth and seventh torque-transmitting mechanisms are engaged. Thus, to transition from the fifth forward ratio and upshift to the sixth forward ratio, the second, fourth, and sixth torque-transmitting mechanism are released and the third, fifth, and seventh torque-transmitting mechanism are engaged.

In a seventh or the next subsequent forward ratio, indicated as F7 in FIG. 6, the first, third, fourth, and sixth torque-transmitting mechanisms are engaged. Thus, to transition from the sixth forward ratio and upshift to the seventh forward ratio, the fifth and seventh torque-transmitting mechanisms are released and the fourth and sixth torque-transmitting mechanisms are engaged.

In an eighth or the next subsequent forward ratio, indicated as F8 in FIG. 6, the second, third, fifth and seventh torque-transmitting mechanisms are engaged. Thus, to transition from the seventh forward ratio and upshift to the eighth forward ratio, the first and fourth and sixth torque-transmitting mechanisms are released and the second, fifth and seventh torque-transmitting mechanisms are engaged.

In a ninth or the next subsequent forward ratio, indicated as F9 in FIG. 6, the second, third, fourth, and sixth torque-transmitting mechanisms are engaged. Thus, to transition from the eighth forward ratio and upshift to the ninth forward ratio, the fifth and seventh torque-transmitting mechanisms are released and the fourth and sixth torque-transmitting mechanisms are engaged.

In a tenth or the next subsequent forward ratio, indicated as F10 in FIG. 6, the first, second, fourth, and seventh torque-transmitting mechanisms are engaged. Thus, to transition from the ninth forward ratio and upshift to the tenth forward ratio, the third and sixth torque-transmitting mechanisms are released and the first and seventh torque-transmitting mechanisms are engaged.

In an eleventh or the next subsequent forward ratio, indicated as F11 in FIG. 6, the first, third, fourth, and seventh torque-transmitting mechanisms are engaged. Thus, to transition from the tenth forward ratio and upshift to the eleventh forward ratio, the second torque-transmitting mechanism is released and the third torque-transmitting mechanism is engaged.

In a twelfth or the next subsequent forward ratio, indicated as F12 in FIG. 6, the second, third, fourth, and seventh torque-transmitting mechanisms are engaged. Thus, to transition from the eleventh forward ratio and upshift to the twelfth forward ratio, the first torque-transmitting mechanism is released and the second torque-transmitting mechanism is engaged.

The present disclosure contemplates that downshifts follow the reverse sequence of the corresponding upshifts (as described above), and several power-on skip-shifts that are single-transition (e.g. from 1st to 3rd or 3rd to 1st) or double-transition are possible.

In the following table, one non-limiting example of a transmission capable of achieving ten forward ranges with their corresponding gear ratios and gear steps is shown below.

| Range | Ratio | Gear Step |
|---|---|---|
| F1 | 16.28 | N/A |
| F2 | 11.80 | 1.36 |
| F3 | 8.55 | 1.36 |

-continued

| Range | Ratio | Gear Step |
|---|---|---|
| F4 | 6.23 | 1.44 |
| F5 | 4.98 | 1.23 |
| F6 | 3.61 | 1.36 |
| F7 | 2.61 | 1.36 |
| F8 | 1.90 | 1.44 |
| F9 | 1.38 | 1.36 |
| F10 | 1.00 | 1.36 |

Referring to FIG. 7, another example of a truth table is shown representing a state of engagement of various torque transmitting mechanisms in each of the available forward speeds or gear ratios of the transmissions illustrated in FIGS. 3 and 5. It is to be understood that FIG. 7 is only one example of any number of truth tables possible for achieving at least ten forward ratios and one reverse ratio, and one skilled in the art is capable of configuring diameters, gear tooth counts, and gear configurations to achieve other ratios.

In the example of FIG. 7, there are three possible reverse speeds or ratios. However, in another embodiment it may that only one or two reverse speeds or ratios are achieved.

In neutral (Neu), none of the torque-transmitting mechanisms carry torque. One or more of the torque-transmitting mechanisms, however, may be engaged in neutral but not carrying torque.

A first forward ratio (shown as F1) in the table of FIG. 7 is achieved by engaging the first torque-transmitting mechanism, the second torque-transmitting mechanism, the fifth torque-transmitting mechanism, and the sixth torque-transmitting mechanism. Thus, in F1 or low, the three brakes and one clutch are engaged. In FIG. 2, for example, the first torque-transmitting mechanism 258, the second torque-transmitting mechanism 260, the fifth torque-transmitting mechanism 266, and the sixth torque-transmitting mechanism 268 are engaged.

In a second or subsequent forward ratio, indicated as F2 in FIG. 7, the first torque-transmitting mechanism, the third torque-transmitting mechanism, the fifth torque-transmitting mechanism, and sixth torque-transmitting mechanism are selectively engaged. Therefore, when transitioning between the first forward ratio and the second forward ratio, the second torque-transmitting mechanism is released and the third torque-transmitting mechanism is engaged.

In a third or subsequent forward ratio, indicated as F3 in FIG. 7, the second, third, fifth, and sixth torque-transmitting mechanisms are engaged. To transition from the second forward ratio to the third forward ratio, for example, the first torque-transmitting mechanism is released and the second torque-transmitting mechanism is engaged.

In a fourth or the next subsequent forward ratio, indicated as F4 in FIG. 7, the first, second, fifth and seventh torque-transmitting mechanisms are engaged. Thus, to transition from the third forward ratio and upshift to the fourth forward ratio, the third and sixth torque-transmitting mechanisms are released and the first and seventh torque-transmitting mechanisms are engaged.

In a fifth or the next subsequent forward ratio, indicated as F5 in FIG. 7, the first, second, fourth, and sixth torque-transmitting mechanisms are engaged. Thus, to transition from the fourth forward ratio and upshift to the fifth forward ratio, the fifth and seventh torque-transmitting mechanisms are released and the fourth and sixth torque-transmitting mechanisms are engaged.

In a sixth or the next subsequent forward ratio, indicated as F6 in FIG. 7, the first, third, fifth and seventh torque-transmitting mechanisms are engaged. Thus, to transition from the fifth forward ratio and upshift to the sixth forward ratio, the second, fourth, and sixth torque-transmitting mechanism are released and the third, fifth, and seventh torque-transmitting mechanism are engaged.

In a seventh or the next subsequent forward ratio, indicated as F7 in FIG. 7, the first, third, fourth, and sixth torque-transmitting mechanisms are engaged. Thus, to transition from the sixth forward ratio and upshift to the seventh forward ratio, the fifth and seventh torque-transmitting mechanisms are released and the fourth and sixth torque-transmitting mechanisms are engaged.

In an eighth or the next subsequent forward ratio, indicated as F8 in FIG. 7, the second, third, fifth and seventh torque-transmitting mechanisms are engaged. Thus, to transition from the seventh forward ratio and upshift to the eighth forward ratio, the first and fourth and sixth torque-transmitting mechanisms are released and the second, fifth and seventh torque-transmitting mechanisms are engaged.

In a ninth or the next subsequent forward ratio, indicated as F9 in FIG. 7, the second, third, fourth, and sixth torque-transmitting mechanisms are engaged. Thus, to transition from the eighth forward ratio and upshift to the ninth forward ratio, the fifth and seventh torque-transmitting mechanisms are released and the fourth and sixth torque-transmitting mechanisms are engaged.

In a tenth or the next subsequent forward ratio, indicated as F10 in FIG. 7, the first, second, fourth, and seventh torque-transmitting mechanisms are engaged. Thus, to transition from the ninth forward ratio and upshift to the tenth forward ratio, the third and sixth torque-transmitting mechanisms are released and the first and seventh torque-transmitting mechanisms are engaged.

In an eleventh or the next subsequent forward ratio, indicated as F11 in FIG. 7, the first, third, fourth, and seventh torque-transmitting mechanisms are engaged. Thus, to transition from the tenth forward ratio and upshift to the eleventh forward ratio, the second torque-transmitting mechanism is released and the third torque-transmitting mechanism is engaged.

In a twelfth or the next subsequent forward ratio, indicated as F12 in FIG. 7, the second, third, fourth, and seventh torque-transmitting mechanisms are engaged. Thus, to transition from the eleventh forward ratio and upshift to the twelfth forward ratio, the first torque-transmitting mechanism is released and the second torque-transmitting mechanism is engaged.

In a first reverse speed or ratio, indicated as R1 in FIG. 7, the second, fifth, sixth and eighth torque-transmitting mechanisms are engaged.

In a second reverse ratio, indicated as R2 in FIG. 7, the second, fourth, sixth, and eighth torque-transmitting mechanisms are engaged. Thus, to transition from the first reverse ratio and shift to the second reverse ratio, the fourth torque-transmitting mechanism is engaged and the fifth torque-transmitting mechanism is released.

In a third reverse ratio, indicated as R3 in FIG. 7, the second, fourth, seventh, and eighth torque-transmitting mechanisms are engaged. Thus, to transition from the second reverse ratio and shift to the third reverse ratio, the seventh torque-transmitting mechanism is engaged and the sixth torque-transmitting mechanism is released.

The present disclosure contemplates that downshifts follow the reverse sequence of the corresponding upshifts (as described above), and several power-on skip-shifts that are single-transition (e.g. from 1st to 3rd or 3rd to 1st) or double-transition are possible.

In the following table, one non-limiting example of a transmission capable of achieving eight forward ranges and three reverse ranges with their corresponding gear ratios is shown below.

| Range | Ratio |
|---|---|
| F1 | 11.151 |
| F2 | 8.045 |
| F3 | 5.450 |
| F4 | 3.932 |
| F5 | 2.836 |
| F6 | 1.921 |
| F7 | 1.386 |
| F8 | 1.000 |
| R1 | −11.151 |
| R2 | −3.932 |
| R3 | −1.386 |

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input member;
an output member;
first, second, third and fourth planetary gearsets each having first, second and third members;
a plurality of interconnecting members each connected between at least one of the first, second, third, and fourth planetary gearsets and at least another of the first, second, third, and fourth planetary gearsets;
a first torque-transmitting mechanism selectively engageable to interconnect the first member of the first planetary gearset and the first member of the second planetary gearset with a stationary member;
a second torque-transmitting mechanism selectively engageable to interconnect the second member of the first planetary gearset with a first gear, the first gear and the input member being disposed along a first axis;
a third torque-transmitting mechanism selectively engageable to interconnect the second member of the second planetary gearset and the third member of the first planetary gearset with the first gear;
a fourth torque-transmitting mechanism selectively engageable to interconnect the first member of the third planetary gearset and a second gear with the second member of the third planetary gearset and the first member of the fourth planetary gearset, the second gear and the output being disposed along a second axis;
a fifth torque-transmitting mechanism selectively engageable to interconnect the third member of the third planetary gearset with the stationary member;
a sixth torque-transmitting mechanism selectively engageable to interconnect the third member of the fourth planetary gearset with the stationary member;
a seventh torque-transmitting mechanism selectively engageable to interconnect the second member of the third planetary gearset and the first member of the fourth planetary gearset to the second member of the fourth planetary gearset; and an eighth torque-transmission mechanism selectively engageable to interconnect the third member of the first planetary gearset and the second member of the second planetary gearset with a stationary member;

wherein, the first axis and second axis are parallel to but offset from one another;

wherein the torque transmitting mechanisms are selectively engageable in combinations of at least four to establish at least ten forward speed ratios and at least one reverse speed ratio between the input member and the output member.

2. The multiple speed transmission of claim 1, further comprising a third gear coupled between the first and second gears for transferring torque between the first axis and the second axis.

3. The multiple speed transmission of claim 1, wherein the plurality of interconnecting members includes a first interconnecting member continuously interconnecting the first member of the first planetary gearset with the first member of the second planetary gearset.

4. The multiple speed transmission of claim 1, wherein the plurality of interconnecting members includes a second interconnecting member directly connected to the second member of the first planetary gearset.

5. The multiple speed transmission of claim 1, wherein the plurality of interconnecting members includes a third interconnecting member continuously interconnecting the third member of the first planetary gearset with the second member of the second planetary gearset.

6. The multiple speed transmission of claim 1, wherein the plurality of interconnecting members includes a fourth interconnecting member directly connected to the first gear.

7. The multiple speed transmission of claim 1, wherein the plurality of interconnecting members includes a fifth interconnecting member continuously interconnecting the first member of the third planetary gearset to the second gear.

8. The multiple speed transmission of claim 1, wherein the plurality of interconnecting members includes a sixth interconnecting member directly connected to the third member of the third planetary gearset.

9. The multiple speed transmission of claim 1, wherein the plurality of interconnecting members includes a seventh interconnecting member directly connected to the third member of the fourth planetary gearset.

10. The multiple speed transmission of claim 1, wherein the plurality of interconnecting members includes an eighth interconnecting member continuously interconnecting the second member of the third planetary gearset to the first member of the fourth planetary gearset.

11. The multiple speed transmission of claim 1, wherein the input member is directly connected to the third member of the second planetary gearset and the output member is directly connected to the second member of the fourth planetary gearset.

12. A multiple speed transmission, comprising:
an input member;
an output member;
first, second, third and fourth planetary gearsets each having first, second and ring gears;
a plurality of interconnecting members each connected between at least one of the first, second, third, and fourth planetary gearsets and at least another of the first, second, third, and fourth planetary gearsets;
a first torque-transmitting mechanism selectively engageable to interconnect the sun gear of the first planetary gearset and the sun gear of the second planetary gearset with a stationary member;
a second torque-transmitting mechanism selectively engageable to interconnect the carrier member of the first planetary gearset with a first gear, the first gear and the input member being disposed along a first axis;
a third torque-transmitting mechanism selectively engageable to interconnect the carrier member of the second planetary gearset and the ring gear of the first planetary gearset with the first gear;
a fourth torque-transmitting mechanism selectively engageable to interconnect the sun gear of the third planetary gearset and a second gear with the carrier member of the third planetary gearset and the sun gear of the fourth planetary gearset, the second gear and the output being disposed along a second axis;
a fifth torque-transmitting mechanism selectively engageable to interconnect the ring gear of the third planetary gearset with the stationary member;
a sixth torque-transmitting mechanism selectively engageable to interconnect the ring gear of the fourth planetary gearset with the stationary member;
a seventh torque-transmitting mechanism selectively engageable to interconnect the carrier member of the third planetary gearset and the sun gear of the fourth planetary gearset to the carrier member of the fourth planetary gearset; and
an eighth torque-transmission mechanism selectively engageable to interconnect the ring gear of the first planetary gearset and the carrier member of the second planetary gearset with a stationary member;
wherein, the first axis and second axis are parallel to but offset from one another; wherein the torque transmitting mechanisms are selectively engageable in combinations of at least four to establish at least ten forward speed ratios and at least one reverse speed ratio between the input member and the output member.

13. The multiple speed transmission of claim 12, wherein the plurality of interconnecting members includes a first interconnecting member continuously interconnecting the sun gear of the first planetary gearset with the sun gear of the second planetary gearset.

14. The multiple speed transmission of claim 12, wherein the plurality of interconnecting members includes a second interconnecting member directly connected to the carrier member of the first planetary gearset.

15. The multiple speed transmission of claim 12, wherein the plurality of interconnecting members includes a third interconnecting member continuously interconnecting the ring gear of the first planetary gearset with the carrier member of the second planetary gearset.

16. The multiple speed transmission of claim 12, wherein the plurality of interconnecting members includes a fourth interconnecting member directly connected to the first gear.

17. The multiple speed transmission of claim 12, wherein the plurality of interconnecting members includes a fifth interconnecting member continuously interconnecting the sun gear of the third planetary gearset to the second gear.

18. The multiple speed transmission of claim 12, wherein the plurality of interconnecting members includes a sixth interconnecting member directly connected to the ring gear of the third planetary gearset.

19. The multiple speed transmission of claim 12, wherein the plurality of interconnecting members includes a seventh interconnecting member directly connected to the ring gear of the fourth planetary gearset.

20. A multiple speed transmission, comprising:

an input member;

an output member;

first, second, third and fourth planetary gearsets each having first, second and third members;

a plurality of interconnecting members each connected between at least one of the first, second, third, and fourth planetary gearsets and at least another of the first, second, third, and fourth planetary gearsets;

a first torque-transmitting mechanism selectively engageable to interconnect the first member of the first planetary gearset and the first member of the second planetary gearset with a stationary member;

a second torque-transmitting mechanism selectively engageable to interconnect the second member of the first planetary gearset with a first gear;

a third torque-transmitting mechanism selectively engageable to interconnect the second member of the second planetary gearset and the third member of the first planetary gearset with the first gear;

a fourth torque-transmitting mechanism selectively engageable to interconnect the first member of the third planetary gearset and a second gear with the second member of the third planetary gearset and the first member of the fourth planetary gearset;

a fifth torque-transmitting mechanism selectively engageable to interconnect the third member of the third planetary gearset with the stationary member;

a sixth torque-transmitting mechanism selectively engageable to interconnect the third member of the fourth planetary gearset with the stationary member;

a seventh torque-transmitting mechanism selectively engageable to interconnect the second member of the third planetary gearset and the first member of the fourth planetary gearset to the second member of the fourth planetary gearset; and an eighth torque-transmission mechanism selectively engageable to interconnect the third member of the first planetary gearset and the second member of the second planetary gearset with a stationary member;

wherein the torque transmitting mechanisms are selectively engageable in combinations of at least four to establish at least ten forward speed ratios and at least one reverse speed ratio between the input member and the output member.

* * * * *